(12) United States Patent
Koeda

(10) Patent No.: US 7,104,860 B2
(45) Date of Patent: Sep. 12, 2006

(54) METHOD FOR MANUFACTURING A PARTITION WALL FOR A DISPLAY DEVICE

(75) Inventor: Hiroshi Koeda, Suwa (JP)

(73) Assignee: Seiko Epson Corporation, (JP)

( * ) Notice: Subject to any disclaimer, the term of this patent is extended or adjusted under 35 U.S.C. 154(b) by 27 days.

(21) Appl. No.: 10/867,566

(22) Filed: Jun. 14, 2004

(65) Prior Publication Data

US 2005/0012442 A1   Jan. 20, 2005

(30) Foreign Application Priority Data

Jun. 12, 2003   (JP) .............................. 2003-168102

(51) Int. Cl.
*H01J 9/00* (2006.01)

(52) U.S. Cl. ........................ 445/24; 264/497

(58) Field of Classification Search .................. 445/24, 445/25
See application file for complete search history.

(56) References Cited

U.S. PATENT DOCUMENTS

| | | | | |
|---|---|---|---|---|
| 5,730,925 A | * | 3/1998 | Mattes et al. | ................ 264/497 |
| 5,837,960 A | * | 11/1998 | Lewis et al. | ........... 219/121.63 |
| 5,909,083 A | * | 6/1999 | Asano et al. | ................ 313/584 |
| 6,007,764 A | * | 12/1999 | Benda et al. | ................... 419/7 |
| 6,024,619 A | * | 2/2000 | Mori et al. | .................... 445/24 |
| 6,217,816 B1 | * | 4/2001 | Tang | .......................... 264/497 |
| 6,270,388 B1 | * | 8/2001 | Lee | .............................. 445/24 |
| 6,527,606 B1 | * | 3/2003 | Baret et al. | .................... 445/24 |
| 6,595,819 B1 | * | 7/2003 | Kitahara et al. | ............... 445/24 |
| 2005/0087912 A1 | * | 4/2005 | Hwang et al. | .............. 264/497 |

FOREIGN PATENT DOCUMENTS

| | | |
|---|---|---|
| JP | 08-255510 | 10/1996 |
| KR | 1998-067545 | 10/1998 |

* cited by examiner

*Primary Examiner*—Karabi Guharay
*Assistant Examiner*—Dalei Dong
(74) *Attorney, Agent, or Firm*—Harness, Dickey & Pierce, P.L.C.

(57) ABSTRACT

A method is provided for manufacturing a display with a partition wall to form a luminescent cell on a base 30 of the display. The method includes a step of forming an inorganic micro-powder layer in which an inorganic micro-powder layer is formed on the base; and a step for forming thee partition wall in which the partition wall is formed by irradiating the inorganic micro-powder layer on the base with laser light so as to melt the inorganic micro-powder layer and form the partition wall.

5 Claims, 10 Drawing Sheets

METHOD FOR MANUFACTURING A PARTITION WALL FOR A DISPLAY DEVICE

RELATED APPLICATIONS

This application claims priority to Japanese Patent Application No. 2003-168102 filed Jun. 12, 2003 which is hereby expressly incorporated by reference herein in its entirety.

BACKGROUND

1. Field of the Invention

The present invention relates to a display including a partition wall on a substrate, and to a method and a device for manufacturing such a display.

2. Description of the Related Art

The needs for large flat displays have been increasing in recent years. Among various types of such large flat displays, plasma display panels (PDPs) have made significant penetration.

Since the luminous efficiency of PDPs largely depends on the capacity of cells making up each pixel, it is necessary to ensure the cell capacity is large enough for increasing the luminous efficiency, which is an issue to be solved. A typical way to increase the cell capacity is increasing the height of a partition wall of each cell.

Since the aperture ratio of each cell decreases as the width of the partition wall increases, the ratio of the height and width (height/width) of the partition wall should be made large throughout a large substrate.

Two major methods for forming such a partition wall are a scraping method for making a pattern wall by sandblasting and a screen printing method. The sandblasting can produce a partition wall with a favorable height-width ratio, however, it requires many hours of work. As for the screen printing method, in which glass paste is patterned and sintered, the height of the glass paste that can be applied in a single process is limited. In addition, the screen printing method requires time-consuming complicated processing, which can reduce productivity and possibly damage a cell pattern.

Therefore, another method for forming a partition wall of a cell has been proposed, using a preformed fixed-width green tape as an insulating layer (see Japanese Unexamined Patent Publication No. 8-255510 (pp. 1–3, FIG. 1), for example).

A problem arises, however, when forming a partition wall of a cell using this green tape. It is required to make a large partition-wall pattern associated with a large substrate in advance. The problem is that it is difficult and time consuming to evenly attach a large green tape onto this large substrate, which can be an obstacle to raising efficiency in manufacturing large flat displays.

To address this problem, the present invention aims to provide a method for manufacturing a display that is capable of economically providing a partition wall of a luminescent cell with high precision regardless of the size of a substrate of the display, a device for manufacturing such a display, and a display manufactured thereby.

SUMMARY

A method for manufacturing a display having a partition wall on a base according to a first aspect of the present invention includes the following steps: forming an inorganic micro-powder layer on the base; and forming the partition wall by irradiating the inorganic micro-powder layer on the base with laser light to melt the inorganic micro-powder layer.

According to the above-mentioned features, the inorganic micro-powder layer is formed on the base in the step for forming the inorganic micro-powder layer. Also, the partition wall is formed by irradiating the inorganic micro-powder layer on the base with laser light to melt the inorganic micro-powder layer in the step for forming the partition wall.

Therefore, the partition wall is formed only by irradiating the inorganic micro-powder layer on the base with laser light to melt the inorganic micro-powder layer after forming the inorganic micro-powder layer on the base. This makes it possible to economically manufacture the partition wall of a luminescent cell with high precision regardless of the size of a substrate of the display.

In addition to the above-mentioned features of the first aspect, the micro-powder layer is made of a glass micro-powder to which a pigment is added so as to prevent visible light from leaking from the partition wall according to a second aspect of the present invention.

According to the above-mentioned features, the micro-powder layer is made of a glass micro-powder. Also, a pigment is added to the glass micro-powder so as to prevent visible light from leaking from the partition wall.

Thus the partition wall serves as a black stripe to prevent visible light from leaking from adjacent luminescent cells after forming the partition wall, and thereby improving the luminous contrast of the luminescent cells.

In addition to the above-mentioned features of the second aspect, the pigment includes a component absorbing the laser light according to a third aspect of the present invention.

According to the above-mentioned features, the pigment includes a component absorbing the laser light. This improves efficiency in absorbing the laser light and helps the micro-powder layer melt.

In addition to the above-mentioned features of any of the first through third aspects, a scanning operation of the laser light is carried out along the inorganic micro-powder layer in an atmosphere that is decompressed from atmospheric pressure in the step for forming the partition wall according to a fourth aspect of the present invention.

According to the above-mentioned features, the scanning operation of the laser light is carried out along the inorganic micro-powder layer in an atmosphere that is decompressed from atmospheric pressure in the step for forming the partition wall.

Therefore, the partition wall is formed only by carrying out the scanning operation of the laser light along the inorganic micro-powder layer in order for the laser light to melt the inorganic micro-powder layer. In this case, since the inorganic micro-powder layer is melted by means of the laser light in an atmosphere that is decompressed from atmospheric pressure, it is possible to prevent a hole containing air from being formed and the air from being trapped in the micro-powder layer that has been melted when melting the micro-powder layer. Since no air is trapped in the micro-powder layer that has been melted, no air will leak from the partition wall while using the display. Thus there is no adverse effect on the composition of a luminescent gas in the luminescent cell.

In addition to the above-mentioned features of the fourth aspect, the scanning operation of the laser light is carried out in an inert gas atmosphere according to a fifth aspect of the present invention.

According to the above-mentioned features, the scanning operation of the laser light is carried out in an inert gas atmosphere.

This makes it possible to reduce the void ratio of the partition wall that has been formed when irradiating the micro-powder layer with the laser light to melt the micro-powder layer and form the partition wall in an atmosphere that is decompressed from atmospheric pressure.

Here, meltdown of the micro-powder layer is carried out in an inert gas atmosphere which preferably is the same type as an inert gas filling the luminescent cell of the display.

In addition to the above-mentioned features of the fifth aspect, the method for manufacturing a display also includes a step for planarizing the inorganic micro-powder layer with a blade according to a sixth aspect of the present invention.

According to the above-mentioned features, the inorganic micro-powder layer is planarized with a blade in the step for planarizing.

This makes it possible to equalize the height of the partition wall that has been formed through meltdown with the laser light.

In addition to the above-mentioned features of the sixth aspect, the height of the partition wall on the base is set by repeating the step of forming the inorganic micro-powder layer, the step of planarizing the inorganic micro-powder layer, and the step of forming the partition wall according to a seventh aspect of the present invention.

According to the above-mentioned features, the partition wall on the base is provided at a desired height by repeating the step of forming the inorganic micro-powder layer, the step of planarizing the inorganic micro-powder layer, and the step of forming the partition wall. This makes it possible to freely set a desired height of the partition wall.

In addition to the above-mentioned features of the first or seventh aspect, the method for manufacturing a display also includes the following steps according to an eighth aspect of the present invention: absorbing the inorganic micro-powder layer remaining unmelted after forming the partition wall; and cleaning the inorganic micro-powder layer remaining unmelted on the base after absorbing the inorganic micro-powder layer and drying the base.

According to the above-mentioned features, an inorganic micro-powder remaining unmelted after forming the partition wall is absorbed in the step for absorbing the inorganic micro-powder layer. Also, the inorganic micro-powder layer remaining unmelted on the base after absorbing the inorganic micro-powder layer is cleaned and then the base is dried in the step for cleaning and drying.

This ensures that only the partition wall is provided on the base of the display and an unnecessary inorganic micro-powder is absorbed and collected. Furthermore, by cleaning the unnecessary inorganic micro-powder from the base and the drying the base, it is possible to prevent the unnecessary inorganic micro-powder from adhering to the base including the partition wall.

A device for manufacturing a display having a partition wall on a base according to a ninth aspect of the present invention includes an inorganic micro-powder layer feeder for forming an inorganic micro-powder layer on the base and a laser light source for forming the partition wall by irradiating the inorganic micro-powder layer on the base with laser light to melt the inorganic micro-powder layer.

According to the above-mentioned configuration, the inorganic micro-powder layer feeder forms the inorganic micro-powder layer on the base. Also, the laser light source for forming the partition wall forms the partition wall by irradiating the inorganic micro-powder layer on the base with laser light to melt the inorganic micro-powder layer.

Thus, after forming the inorganic micro-powder layer on the base, the partition wall is formed only by irradiating the inorganic micro-powder layer on the base with laser light to melt the inorganic micro-powder layer. This makes it possible to economically manufacture the partition wall of a luminescent cell with high precision regardless of the size of a substrate of the display.

In addition to the above-mentioned features of the ninth aspect, the device for manufacturing a display also includes an air decompression part for making an inert gas atmosphere that is decompressed from atmospheric pressure for carrying out a scanning operation of the laser light along the inorganic micro-powder layer in an atmosphere that is decompressed from atmospheric pressure according to a tenth aspect of the present invention.

According to the above-mentioned configuration, the air decompression part makes an inert gas atmosphere that is decompressed from atmospheric pressure for carrying out the scanning operation of the laser light along the inorganic micro-powder layer in an atmosphere that is decompressed from atmospheric pressure.

Therefore, the partition wall is formed only by carrying out the scanning operation of the laser light along the inorganic micro-powder layer in order for the laser light to melt the inorganic micro-powder layer. In this case, since the inorganic micro-powder layer is melted by means of the laser light in an atmosphere that is decompressed from atmospheric pressure, it is possible to prevent a hole containing air from being formed and the air from being trapped in the micro-powder layer that is melted when melting the micro-powder layer. Since no air is trapped in the micro-powder layer that is melted, no air will leak from the partition wall while using the display. Thus there is no adverse effect on the composition of a luminescent gas in the luminescent cell.

This makes it possible to reduce the void ratio of the partition wall that has been formed when irradiating the micro-powder layer with the laser light to melt the micro-powder layer and form the partition wall in an atmosphere that is decompressed from atmospheric pressure. Here, meltdown of the micro-powder layer is carried out in an inert gas atmosphere which preferably is the same type as an inert gas filling the luminescent cell of the display.

In addition to the above-mentioned features of the tenth aspect, the device for manufacturing a display also includes a blade for planarizing the inorganic micro-powder layer according to an eleventh aspect of the present invention.

According to the above-mentioned configuration, the blade planarizes the inorganic micro-powder layer.

This makes it possible to equalize the height of the partition wall that is formed through meltdown with the laser light.

A display according to an twelfth aspect of the present invention includes a partition wall forming a luminescent cell on a base by irradiating an inorganic micro-powder layer formed on the base with laser light to melt the inorganic micro-powder layer.

According to the above-mentioned configuration, the partition wall is formed by irradiating the inorganic micro-powder layer formed on the base of the display with laser light to melt the inorganic micro-powder layer.

Therefore, the partition wall is formed only by irradiating the inorganic micro-powder layer on the base with laser light to melt the inorganic micro-powder layer after forming the inorganic micro-powder layer on the base. This makes it possible to economically manufacture the partition wall of a luminescent cell with high precision regardless of the size of a substrate of the display.

In addition to the above-mentioned features of the twelfth aspect, the display is a plasma display, and the micro-powder layer is made of a glass micro-powder to which a pigment is added so as to prevent visible light from leaking from the partition wall according to a thirteenth aspect of the present invention.

According to the above-mentioned configuration, the display is a plasma display.

Also, the micro-powder layer is made of a glass micro-powder to which a pigment is added so as to prevent visible light from leaking from the partition wall.

Thus the partition wall serves as a black stripe to prevent visible light from leaking from adjacent luminescent cells after forming the partition wall, and thereby improving the luminous contrast of the luminescent cells.

DETAILED DESCRIPTION

Preferred embodiments of the present invention will now be described with reference to the accompanying drawings.

Figure 1:
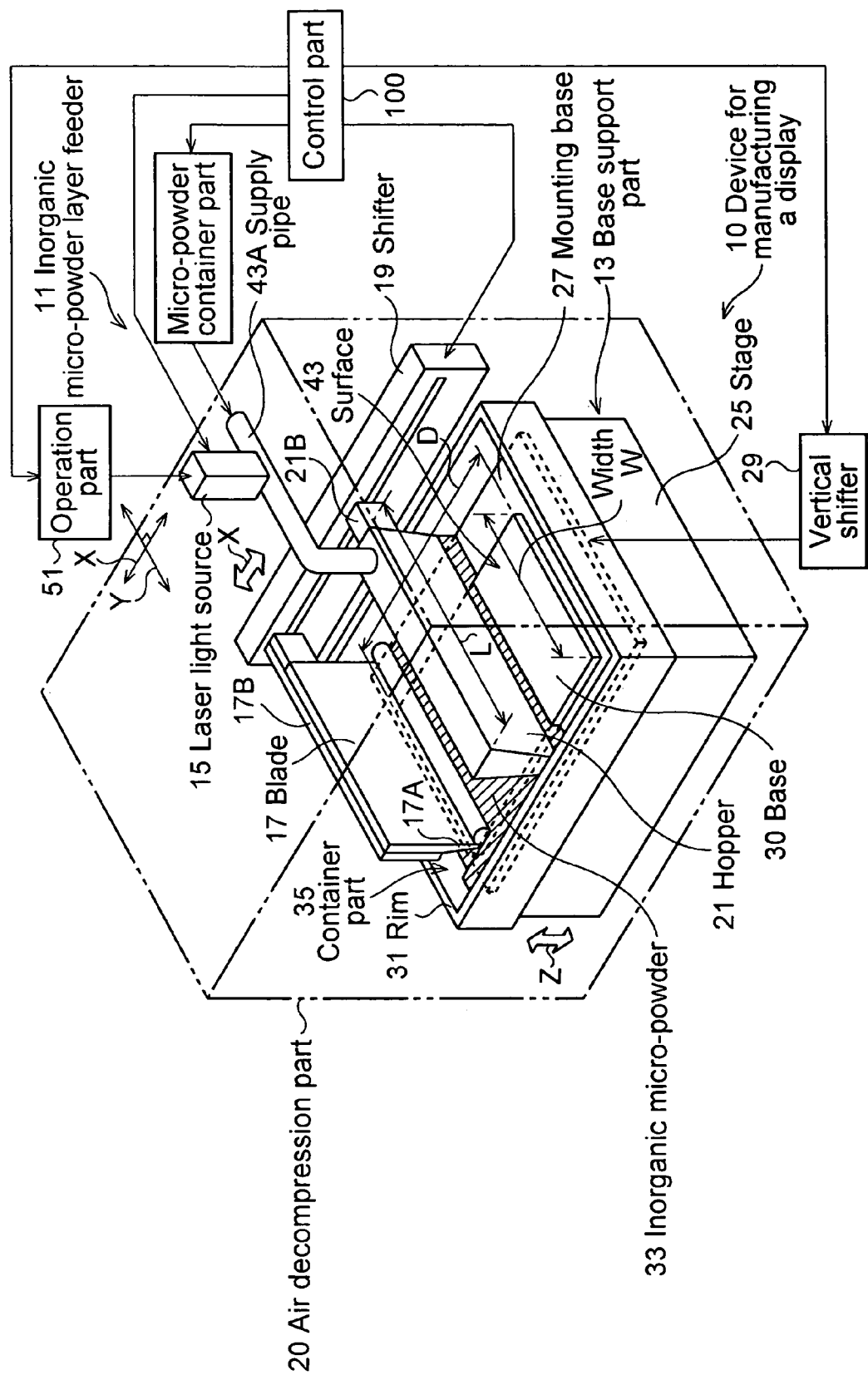
FIG. 1 is a perspective view showing a device for manufacturing a display according to one preferred embodiment of the present invention.

FIG. 1 is a perspective view showing a device for manufacturing a display according to one preferred embodiment of the invention.

A device 10 for manufacturing a display is used for forming a partition wall on a substrate of a flat display, for example, a plasma display. This partition wall is a component of a luminescent cell included in the plasma display.

The device 10 for manufacturing a display shown in FIG. 1 includes an inorganic micro-powder layer feeder 11, a base support part 13, and a laser light source 15 for forming a partition wall, a blade 17, a shifter 19, an air decompression part 20, and a control part 100.

The air decompression part 20 serves as a case covering the laser light source 15, the blade 17, a hopper 21 of the inorganic micro-powder layer feeder 11, and the base support part 13. In the air decompression part 20, an inert gas atmosphere, for example, is decompressed from atmospheric pressure. More specifically, an inert gas atmosphere of xenon gas, neon gas, mixed gas of neon and xenon, or the like can be made inside the air decompression part 20.

The base support part 13 shown in FIG. 1 will now be described.

The base support part 13 in FIG. 1 includes a stage 25, a mounting base 27, and a vertical shifter 29.

The stage 25 accommodates the mounting base 27 and the vertical shifter 29. The mounting base 27 is vertically movable and adjustable in the Z-direction by operating the vertical shifter 29.

A base 30 for forming or manufacturing a partition wall is detachably mounted on the mounting base 27. The base 30 is a large plate-like substrate, for example. The base 30 is also a back glass plate of a plasma display, for example, and may be a transparent glass plate.

The stage 25 in FIG. 1 has a rim 31 on its upper portion. The rim 31 is provided along the four sides of the mounting base 27 and projected in the Z-direction. The rim 31 and the mounting base 27 make up a container part 35 for containing an inorganic micro-powder 33 that will be described later.

The inorganic micro-powder layer feeder 11 shown in FIG. 1 will now be described.

The inorganic micro-powder layer feeder 11 includes a micro-powder container part 41, a supply pipe 43A, and the hopper 21.

The micro-powder container part 41 is, for example, a tank for containing an inorganic micro-powder that is a material of a partition wall. The inorganic micro-powder in the micro-powder container part 41 is supplied to the hopper 21 through the supply pipe 43A.

The hopper 21 is linearly movable in the X-direction, so that an inorganic micro-powder layer can be formed thoroughly on a surface 43 of the base 30. The longitudinal length L of the hopper 21, that is, the length in the Y-direction, is set larger than the width W of the base 30. The hopper 21 is set movable in the X-direction within a range larger than the length of the base 30 in the X-direction. The hopper 21 is supported by a support member 21B.

In FIG. 1, the X-, Y-, and Z-directions are orthogonal each other. The X- and Y-directions extend as forming a horizontal plane, while the Z-direction extends vertically. The X-direction coincides with the linear movement direction of the hopper 21, while the Y-direction is in parallel with the length L of the hopper 21.

The blade 17 shown in FIG. 1 will now be described.

The blade 17 is, for example, a plate-like member made of metal. An edge 17A of the blade 17 is formed in the shape of a knife edge. The blade 17 is supported by a support member 17B.

The blade 17 is linearly movable in the X-direction. The blade 17 sets a predetermined height (width) of an inorganic micro-powder layer formed on the surface 43 of the base 30, and planarizes the surface of the inorganic micro-powder layer.

The shifter 19 shown in FIG. 1 makes the blade 17 and the hopper 21 separately and linearly move in the X-direction.

The shifter 19 makes the blade 17 move linearly in the X-direction within a predetermined range. The range in which the blade 17 is movable is set larger than the length D of the base 30 that is orthogonal to the width W of the base 30.

The shifter 19 also makes the hopper 21 move linearly in the X-direction within a predetermined range. The range in which the hopper 21 is movable is set larger than the length D of the base 30 as described above.

In order for the shifter 19 to make the blade 17 and the hopper 21 separately and linearly move in the X-direction, various mechanisms can be used, e.g. a combination of a motor and a feed screw, a combination of a gear and a chain.

The shifter 19, the vertical shifter 29, and the micro-powder container part 41 act according to commands sent by the control part 100.

The laser light source 15 shown in FIG. 1 will now be described.

The laser light source 15 is movable in the X-, Y-, and Z-directions by operating an operation part 51. The operation part 51 acts according to commands sent by the control part 100. The laser light source 15 also acts according to commands sent by the control part 100.

The laser light source 15 is most preferably a $CO_2$ laser (carbon dioxide laser), for example. This is because using a $CO_2$ laser is the most efficient in melting the inorganic micro-powder 33 of glass, for example, which is a preferable material of the inorganic micro-powder 33 and almost completely absorbs light at a wavelength of 10.6 micrometers.

Here, if a pigment is added to the glass powder used as the inorganic micro-powder 33, the glass powder absorbs light at a wavelength other than 10.6 micrometers and is melted. Therefore, the laser light source 15 is not necessarily limited to the $CO_2$ laser and can be chosen from a wide variety of options.

As a pigment added to the inorganic micro-powder 33 of glass or the like, a black pigment like $Fe_3O_4$ (i.e. black rust) is preferably used, since $Fe_3O_4$ absorbs laser light at almost every wavelength from the laser light source 15 and is less likely to be denatured by heat.

Now, an example of the configuration of a luminescent cell included in a plasma display will be described.

Figure 2:
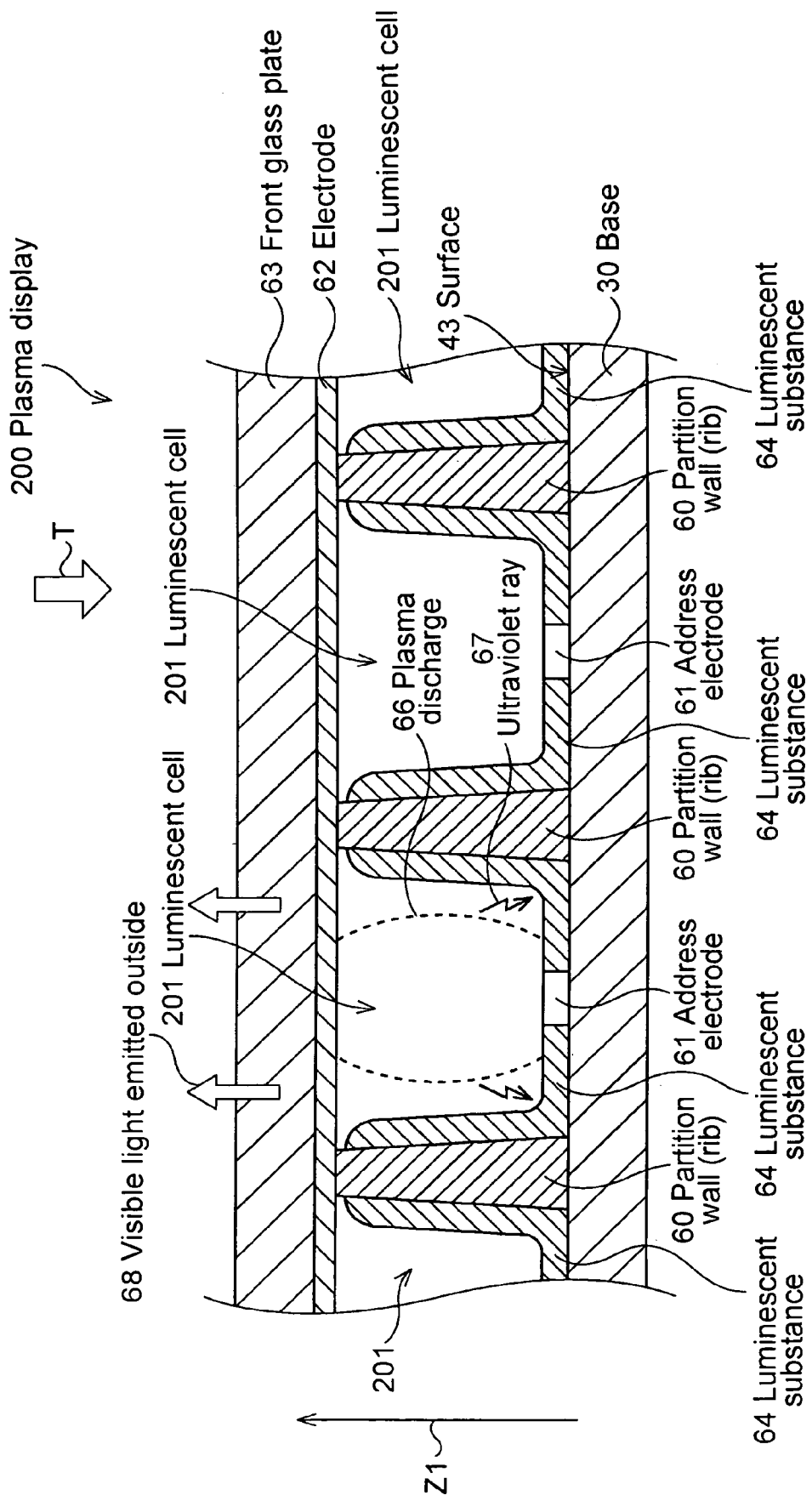
FIG. 2 is a sectional view showing part of a display according to one preferred embodiment of the present invention.
Figure 3:
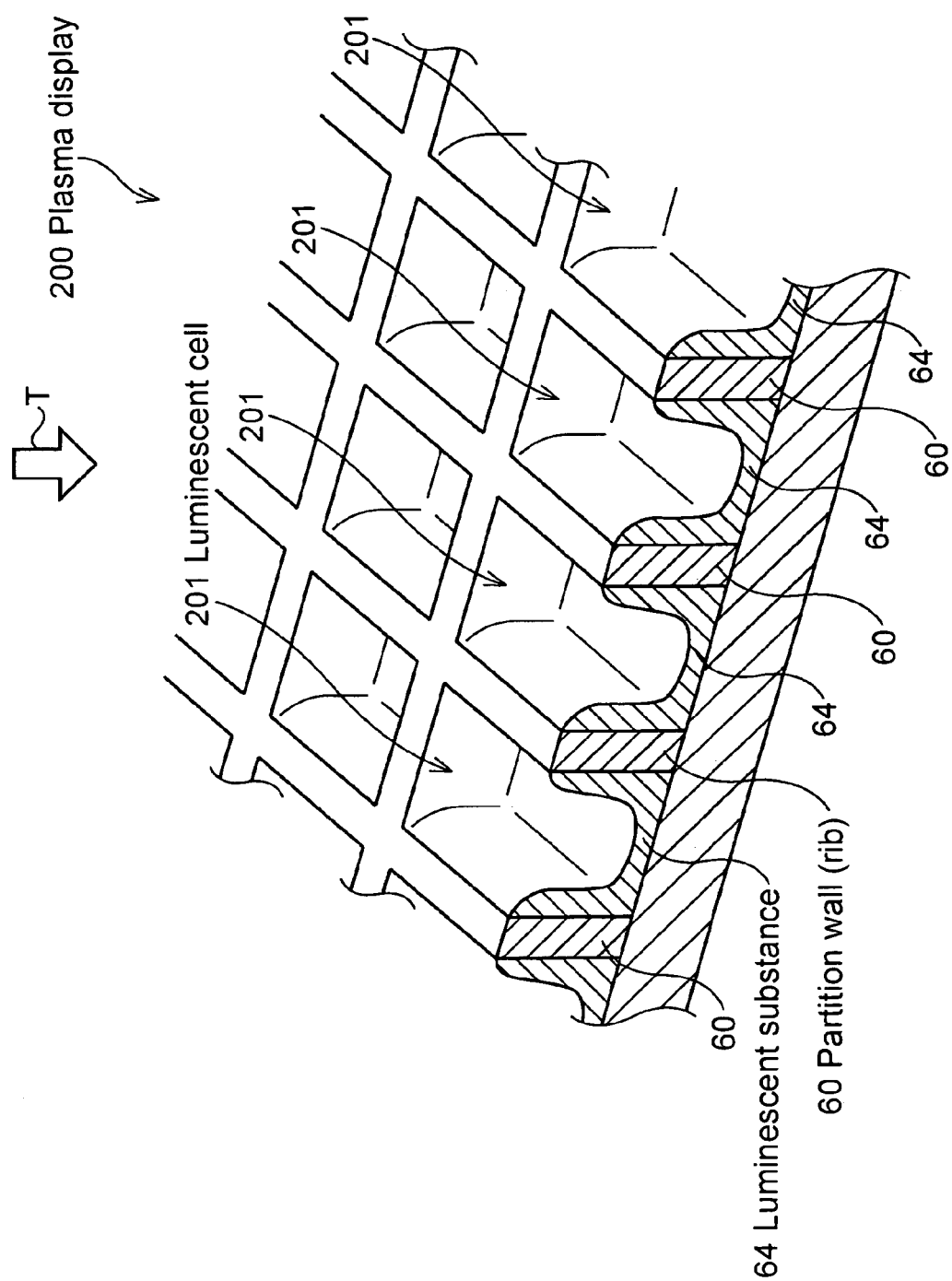
FIG. 3 is a perspective view showing an example of the configuration of a partition wall included in the display shown in FIG. 2.

FIG. 2 shows an example of the configuration of a plasma display including the base 30 shown in FIG. 1. FIG. 3 is a perspective view showing an example of the configuration of a partition wall of a plasma display 200 shown in FIG. 2.

The plasma display 200 shown in FIG. 2 is a so-called direct-current (DC) type and has a luminescent cell 201 shown in FIGS. 2 and 3.

The configuration of the plasma display 200 will now be described.

The plasma display 200 includes the base 30 that is a back glass plate, a partition wall 60, an address electrode 61, an electrode 62, a front glass plate 63, and a luminescent substance 64.

As shown in FIGS. 2 and 3, the partition wall 60 of the plasma display 200 is generally rectangular or square as seen from the T-direction indicated in FIGS. 2 and 3 but may be slightly tapered. The partition wall 60 forms the luminescent cell 201 in the plural number. Each luminescent cell 201 is defined by the partition wall 60.

In each luminescent cell 201, the luminescent substance 64 of different colors is provided. Each adjacent luminescent substance 64 emits red, blue, or green light, and is formed sequentially in each luminescent cell 201. The address electrode 61 is provided at the bottom of the luminescent cell 201.

The partition wall 60 projects vertically in the Z1-direction from the surface 43 of the base 30.

On the inside of the front glass plate 63, the electrode 62 is provided. This electrode 62 is positioned above the luminescent cell 201. The front glass plate 63 and the base 30 are positioned to face each other.

By electrifying the electrode 62 and the address electrode 61 that is selected, the electrode 62, which is transparent, produces a plasma discharge 66. An ultraviolet ray 67 out of the plasma discharge 66 is supplied to the luminescent substance 64, and the luminescent substance 64 emits visible light 68. The visible light 68 is emitted outside in the Z1-direction through the electrode 62, which is transparent, and the front glass plate 63, and thereby displaying color images formed by each luminescent cell 201.

A method for manufacturing a display using the device 10 for manufacturing a display will now be described.

FIGS. 4, 5, and 6 specifically show a method for manufacturing a display according to a preferred embodiment of the present invention.

Figure 7:
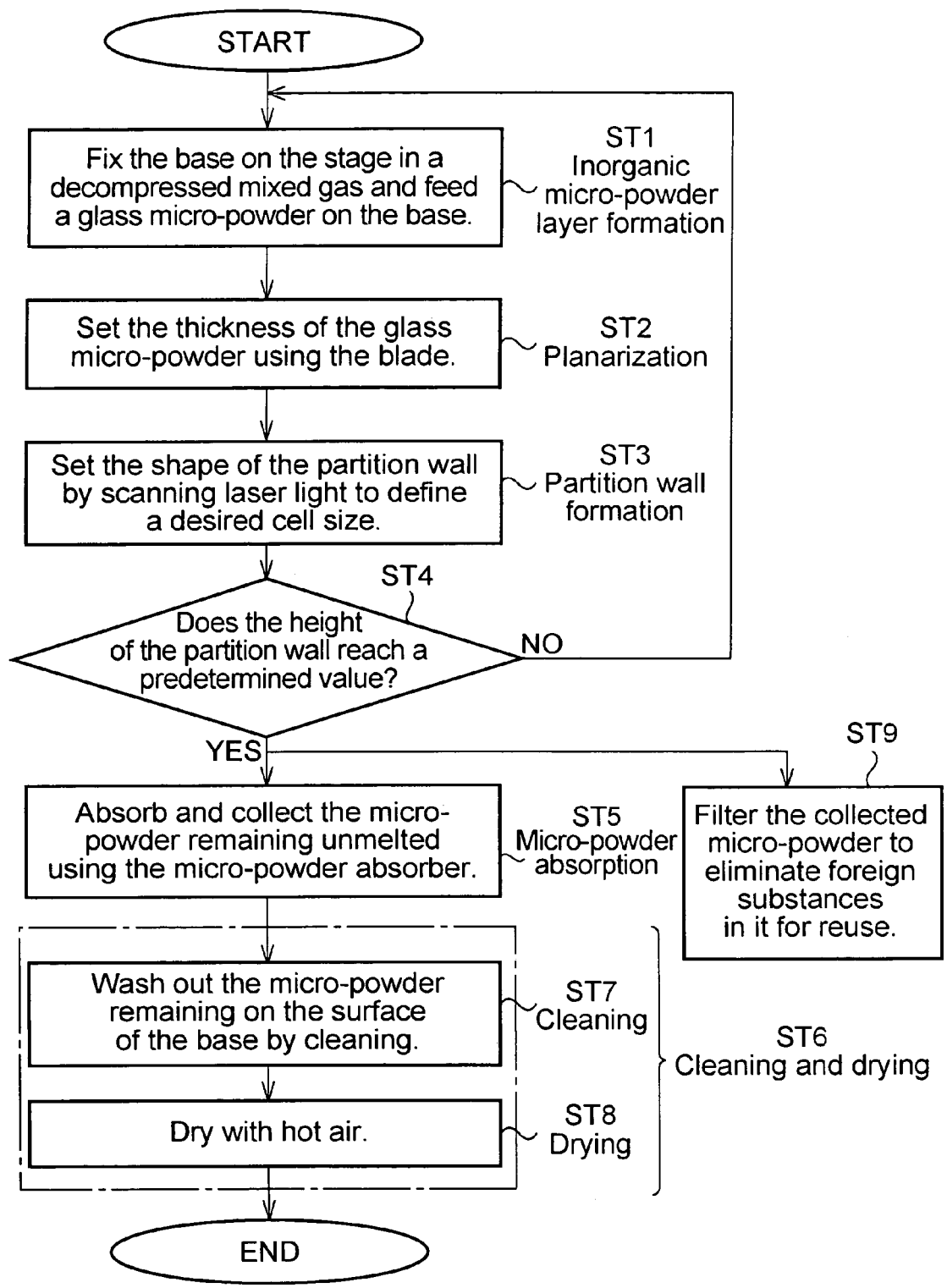
FIG. 7 is a flow chart showing the method for manufacturing a display according to the present invention.

FIG. 7 is a flow chart showing steps of the method for manufacturing a display.

Referring now to FIGS. 4 through 7, the method for manufacturing a display will be described in detail.

ST1: Inorganic Micro-Powder Formation

Figure 4A:
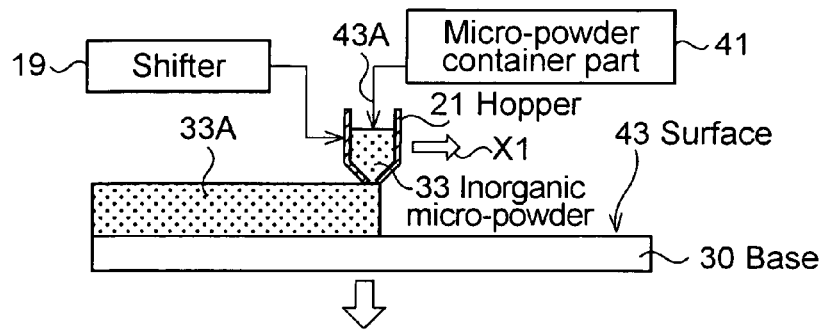
FIGS. 4A–E specifically show an example of a method for manufacturing a display according to the present invention.

In ST1 for inorganic micro-powder layer formation shown in FIG. 7, an inorganic micro-powder layer 33A is formed on the surface 43 of the base 30 as shown in FIG. 4(A).

Here, the base 30 is detachably mounted on the mounting base 27 shown in FIG. 1. The base 30 is placed on a plane defined by the X- and Y-directions on the mounting base 27, and kept horizontally.

With the base 30 placed on the mounting base 27 as shown in FIG. 1, the air decompression part 20 forms an inert gas atmosphere that is decompressed from atmospheric pressure inside. Examples of such an inert gas used here may include neon gas, xenon gas, and mixed gas of neon and xenon.

The reason for choosing neon gas, xenon gas, or mixed gas of neon and xenon here is that an inert gas filled in the luminescent cell 201 shown in FIG. 2 is neon gas, xenon gas, or mixed gas of neon and xenon, and such an inert gas is used as a luminescent gas.

By using an inert gas whose composition is the same as that of the luminescent gas in the luminescent cell 201, the air decompression part 20 forms an inert gas atmosphere that is decompressed from atmospheric pressure inside.

The micro-powder container part 41 shown in FIG. 4(A) feeds the inorganic micro-powder 33 to the hopper 21 through the supply pipe 43A. A glass micro-powder, for example, may be used as the inorganic micro-powder 33. The diameter of the inorganic micro-powder 33 is one micrometer, for example.

The diameter of the inorganic micro-powder 33 may range from 0.1 to 100 micrometers, for example. On one hand, the powder is highly cohesive and easily absorbs moisture and unites into a mass if its diameter is smaller than 0.1 micrometers, making it meaningless to have a small diameter. On the other, it is not preferable to have a diameter larger than 100 micrometers in terms of the filling factor after smelting.

The hopper 21 is moved linearly in the X1 direction in parallel with the base 30 by operating the shifter 19. Thus, the inorganic micro-powder layer 33A of the inorganic micro-powder 33 is formed on the surface 43 of the base 30. The inorganic micro-powder layer 33A is thoroughly formed on the surface 43 of the base 30.

ST2: Planarization

Figure 4B:
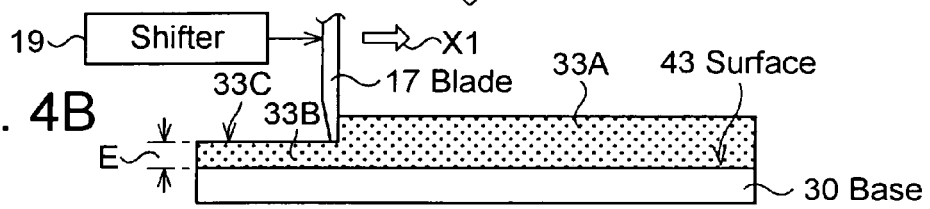

ST2 for planarization shown in FIG. 7 is performed by using the blade 17 as shown in FIG. 4(B). The blade 17 is also referred to as a squeegee. The blade 17 is movable in the X1-direction by operating the shifter 19, and scrapes the inorganic micro-powder layer 33A at a predetermined thickness E, for example 0.1 mm, so that the layer has a fixed thickness. The scraping by the blade 17 makes the inorganic micro-powder layer 33A into an inorganic micro-powder layer 33B having the predetermined thickness E whose surface 33C has been planarized.

ST3: Partition Wall Formation

Figure 4C:
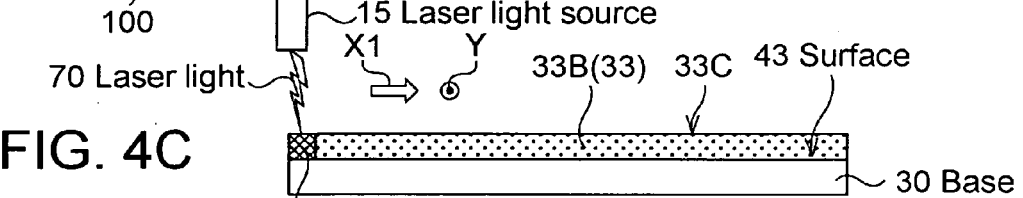

FIG. 4(C) shows ST3 for partition wall formation shown in FIG. 7.

In ST3 for partition wall formation, the inorganic micro-powder layer 33B is irradiated with laser light 70. Here, the control part 100 controls operations of the operation part 51, and thereby carrying out a scanning operation of laser light L in the X1- and Y-directions depending on a predetermined pattern. Thus the inorganic micro-powder layer 33B is irradiated with the laser light 70.

A pigment is added in advance to the inorganic micro-powder 33 of the inorganic micro-powder layer 33B.

This pigment is added to improve efficiency in absorbing carbon dioxide laser light, for example. In addition, the pigment serves as a black stripe to prevent visible light from leaking from adjacent luminescent cells after forming the partition wall, and thereby improving the luminous contrast of the luminescent cells.

Figure 4D:
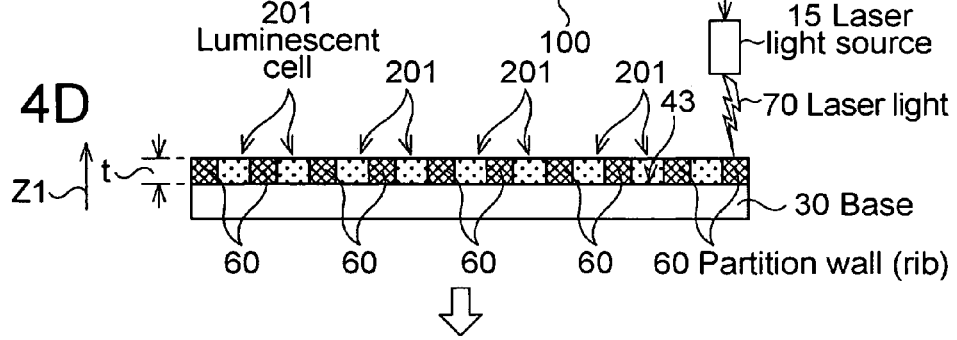

Referring to FIG. 4(C), as the laser light source 15 moves in the X1- and Y-directions, the scanning operation is performed with the laser light 70 from the laser light source 15 in parallel with the base 30. The structure of the luminescent cell 201 as shown in FIGS. 4(D) and 3 is formed as a result of the scanning operation with the laser light 70. The luminescent cell 201 is defined by the partition wall 60 that is adjacent. The partition wall 60 is formed through the process of the laser light 70 irradiation, meltdown, and solidification.

While the laser light 70 causes meltdown and solidification of the inorganic micro-powder layer 33B with a predetermined pattern, the air decompression part 20 shown in FIG. 1 reduces pressure inside. This depressurization has the following advantage.

While the laser light 70 melts the inorganic micro-powder layer 33B with a predetermined pattern, an air hole (a hole containing air) is possibly formed under the atmospheric pressure and the air is trapped in the partition wall. Here, since the meltdown is carried out in a decompressed atmosphere, such an air hole is not likely to be formed.

Therefore, no air is trapped in the partition wall 60 that has been formed. This avoids letting the air out in the luminescent cell 201 while making the luminescent cell 201 emit light with the plasma discharge 66 as shown in FIG. 2. Thus there is no adverse effect on the composition of the luminescent gas in the luminescent cell 201.

In other words, meltdown under a depressurized condition can reduce or eliminate air holes.

Furthermore, the air decompression part 20 shown in FIG. 1 is filled with an inert gas which preferably is the same type as the activated gas in the luminescent cell 201 shown in FIG. 2. This inert gas also prevents the air from being trapped in the partition wall 60.

While the laser light 70 is indicated by a line as an example in FIGS. 4(C) and (D), other options are conceivable to increase scanning efficiency. For example, the laser light 70 may be separated into a plurality of laser beams by using a diffraction grating to further improve efficiency in forming the partition wall 60.

ST4: Judgment

ST4 for judgment shown in FIG. 7 is followed by ST5 for micro-powder absorption in FIG. 7 if the height of the partition wall 60 in the Z1-direction, that is the height t of the partition wall 60 projecting in the Z1-direction from the surface 43 of the base 30, reaches a predetermined value.

ST5: Micro-Powder Absorption

In ST5 for micro-powder absorption shown in FIG. 7, an inorganic micro-powder 33D remaining unmelted between one partition wall 60 and another adjacent partition wall 60 is absorbed and collected from the surface 43 of the base 30 as shown in FIG. 4(D). Upon the operation of a micro-powder absorber 80, this micro-powder absorber 80 collects the inorganic micro-powder 33D remaining unmelted, turning the state of FIG. 4(D) into the state of FIG. 4(E).

The collected micro-powder is reusable after filtering for eliminating foreign substances in ST9 shown in FIG. 7. Thus, the inorganic micro-powder is easy to collect and is used highly efficiently.

ST6: Cleaning and Drying

ST6 for cleaning and drying shown in FIG. 7 includes ST7 for cleaning and ST8 for drying.

Figure 4E:
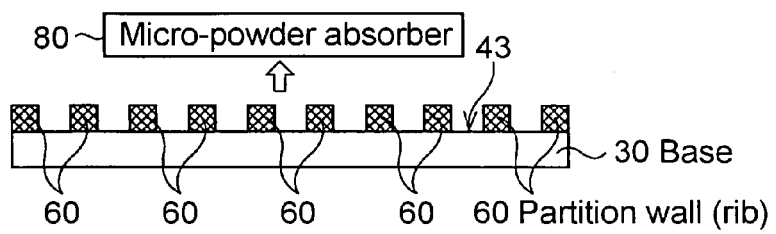

In ST7 for cleaning, the micro-powder remaining uncollected is washed out from the surface 43 by cleaning the base 30 and the partition wall 60 shown in FIG. 4(E) with a surface active agent, for example. Subsequently, the base 30 and the partition wall 60 are dried with hot air, for example.

In this way, no inorganic micro-powder will remain on the surface of the base 30 and the partition wall 60 at all.

Examples of the above-mentioned pigment added to the inorganic micro-powder may include a black pigment.

In the above-mentioned method for manufacturing a display shown in FIGS. 4(A) through (E), the partition wall 60 is formed to the predetermined height t shown in FIG. 4(D) by a single step of forming an inorganic micro-powder layer and a single step of laser light irradiation.

It is also possible to form the partition wall 60 to be higher by multiple steps of forming an inorganic micro-powder layer and multiple steps of laser light irradiation as shown in FIGS. 5 and 6. FIGS. 5 and 6 show steps for forming the partition wall 60 to be higher.

ST1: Inorganic Micro-Powder Layer Formation

Figure 5A:
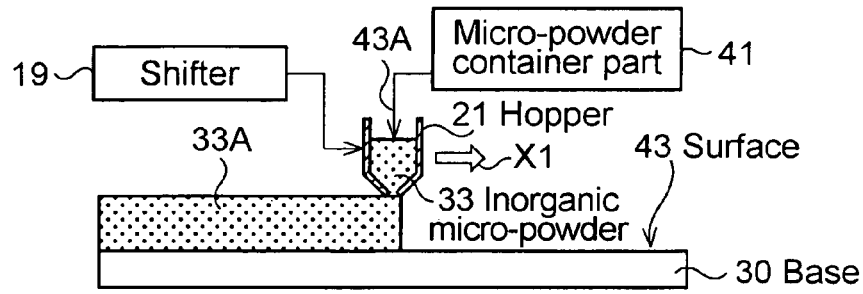
FIGS. 5A–D specifically show another example of the method for manufacturing a display according to the present invention.
Figure 5B:
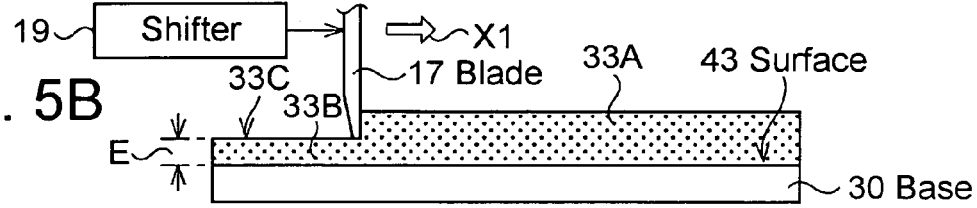
Figure 5C:
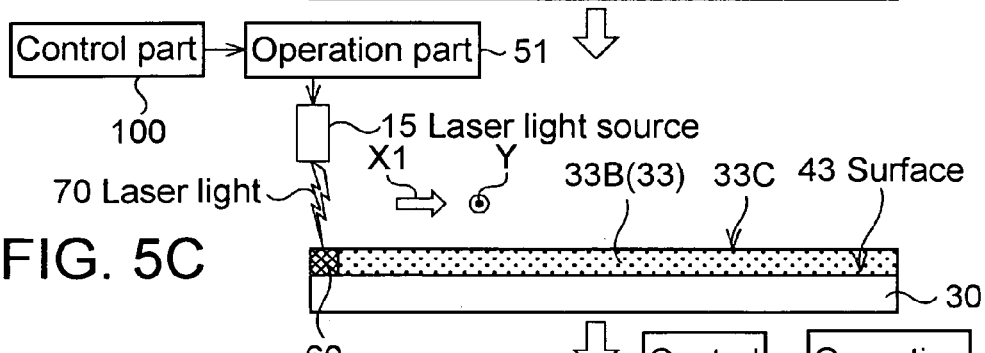
Figure 5D:
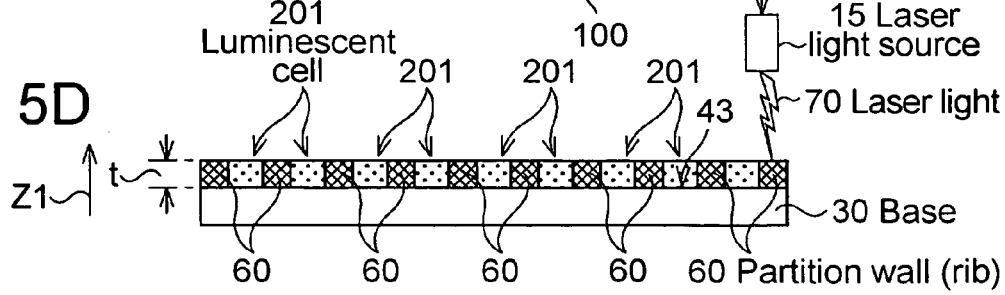

Since FIGS. 5(A) through (D) are the same as FIGS. 4(A) through (D), their description is omitted here. The step shown in FIG. 5(D) is followed by the step shown in FIG. 6(E).

If the height of the partition wall 60 does not reach the predetermined value in ST4 and the height needs to be increased, the process goes back to ST1 for inorganic micro-powder layer formation in FIG. 7.

Figure 6E:
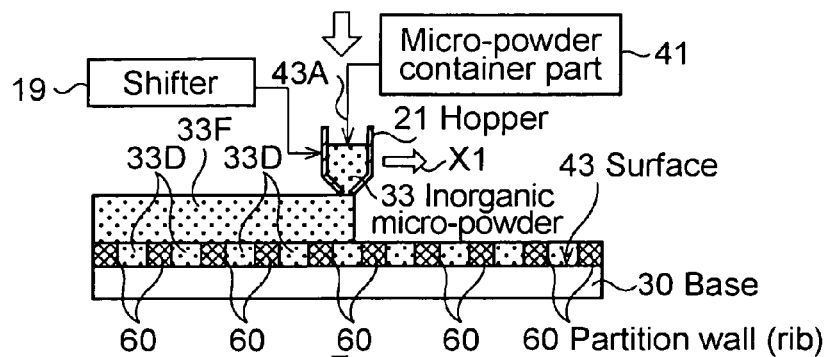
FIGS. 6E–I illustrate steps following the method for manufacturing a display shown in FIG. 5.

In the state of FIG. 6(E), the inorganic micro-powder layer 33D remains unmelted between one partition wall 60 that has been formed and another adjacent partition wall 60 on the surface 43 of the base 30.

In FIG. 6(E), the inorganic micro-powder 33 is further supplied to the partition wall 60 and the inorganic micro-powder layer 33D remaining unmelted through the hopper 21 to form a new inorganic micro-powder layer 33F to a predetermined thickness.

ST2: Planarization

Figure 6F:
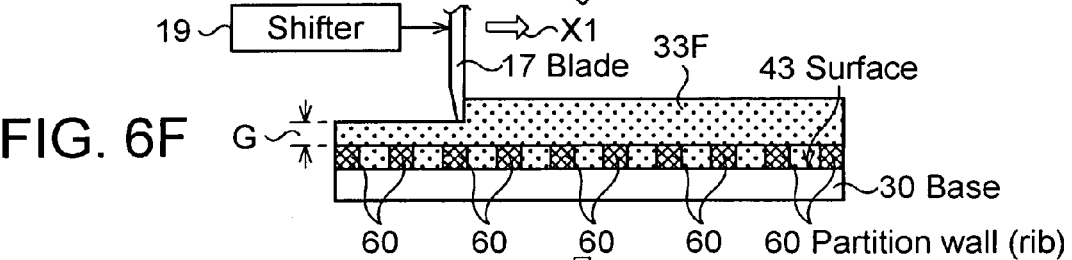

Subsequently, by moving the blade 17 in the X1-direction as shown in FIG. 6(F), the inorganic micro-powder layer 33F is scraped to have a predetermined thickness G. Thus, the inorganic micro-powder layer 33F is planarized.

ST3: Partition Wall Formation

Figure 6G:
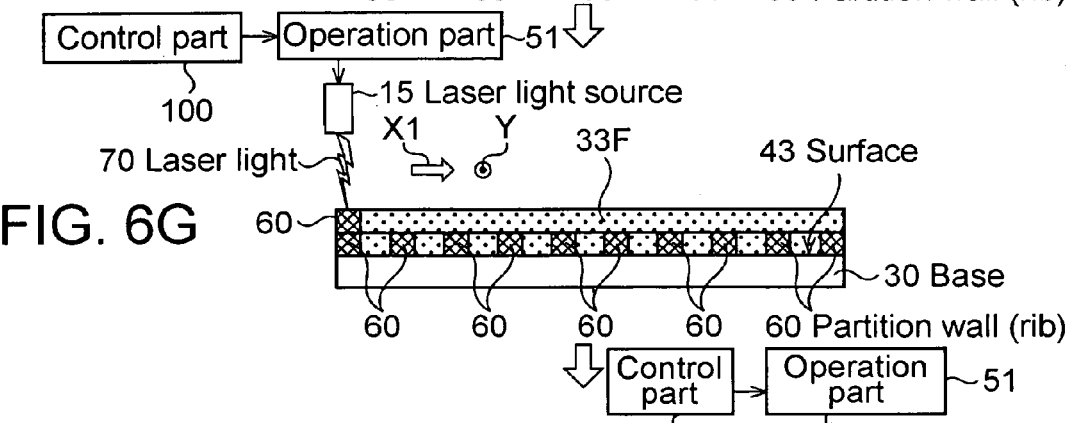

In ST3 for partition wall formation shown in FIG. 7, a scanning operation and irradiation of the laser light 70 is carried out in the X1- and Y-directions with a predetermined pattern on the inorganic micro-powder layer 33F as shown in FIG. 6(G).

Figure 6H:
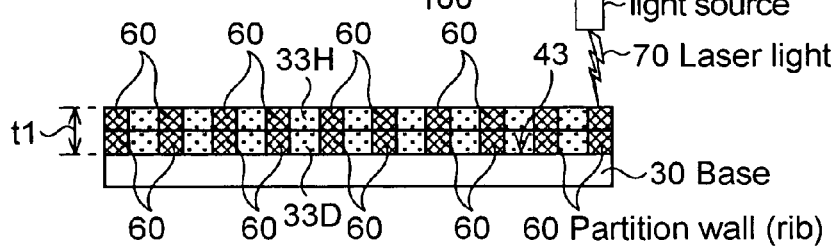
Figure 6I:
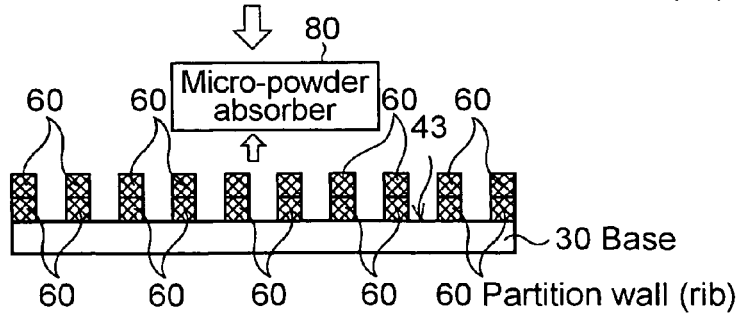

Then, as shown in FIG. 6(H), on the same position of the partition wall 60 of the first layer, the partition wall 60 of another layer is stacked with the same pattern.

The partition wall 60 of the first layer and the partition wall 60 of another layer form a new height t1 of the partition wall (t1=t). Thus, by repeating the process from ST1 for inorganic micro-powder layer formation to ST3 for partition wall formation, the partition wall of the desired height t1 is completed.

Subsequently, as shown in FIG. 6(H), the inorganic micro-powder 33D and an inorganic micro-powder 33H remaining unmelted are absorbed by the micro-powder absorber 80 in ST5 for micro-powder absorption shown in FIG. 7. The base 30 and the partition wall 60, 60 are cleaned in ST7 for cleaning shown in FIG. 7, and then dried with hot air in ST8 for drying.

While the partition wall is made up of the partition wall 60 of the first layer and the partition wall 60 of the second layer in this example shown in FIG. 7, it is also possible to make the partition wall further higher by repeating the process from ST1 for inorganic micro-powder layer formation to ST3 for partition wall formation shown in FIG. 7 three times or more.

Display According to Another Embodiment of the Present Invention

Figure 8:
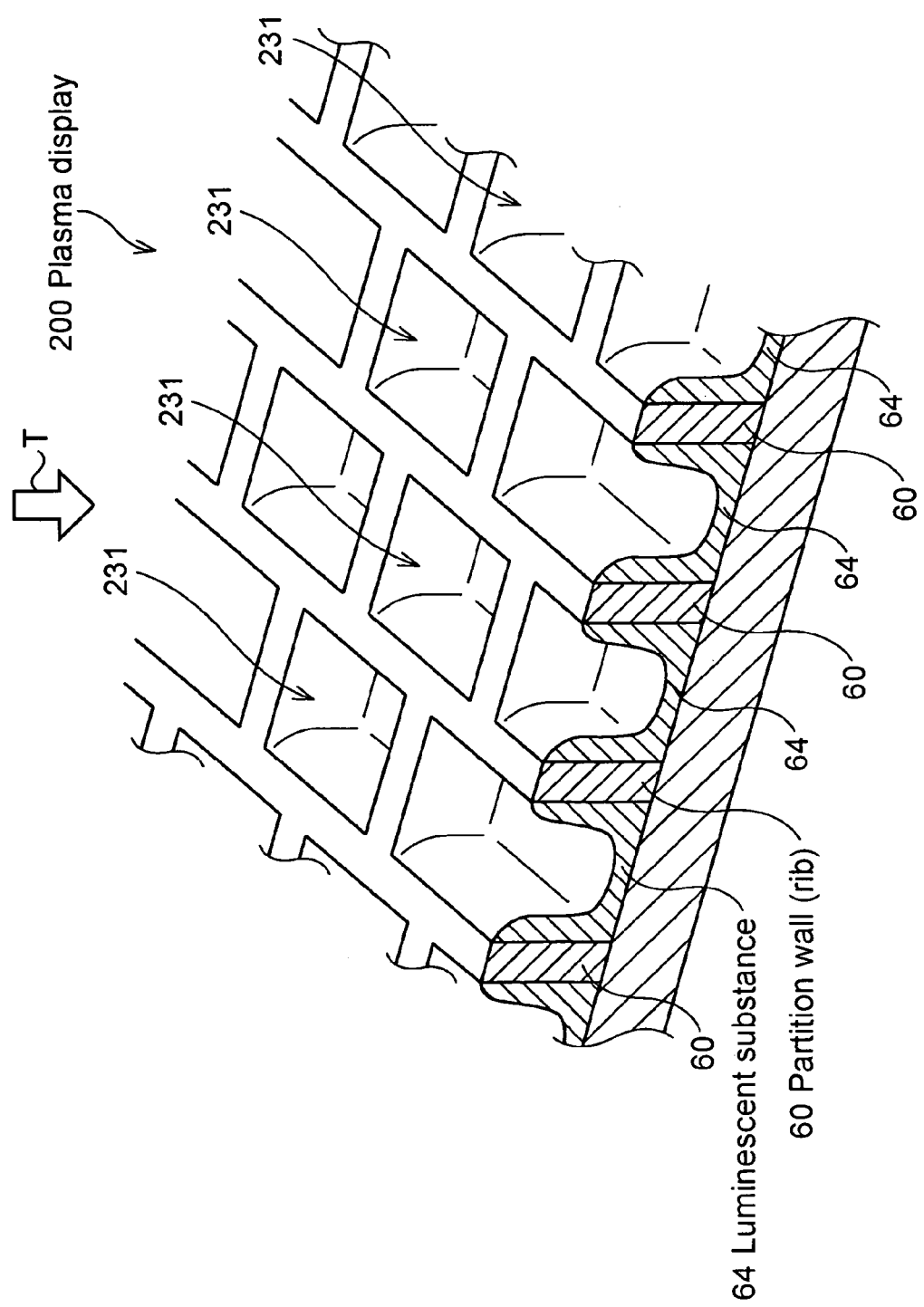
FIG. 8 is a perspective view showing a display according to another embodiment of the present invention with another example of the configuration of the partition wall.

FIG. 8 shows a display according to another embodiment of the present invention. The plasma display 200 shown in FIG. 8 has a different configuration from the luminescent cell 201 shown in FIGS. 2 and 3. In the plasma display 200 shown in FIG. 8, a luminescent cell 231 is staggered by one half pitch, for example. In each luminescent cell 231, the luminescent substance 64 of different colors is provided.

Figure 9:
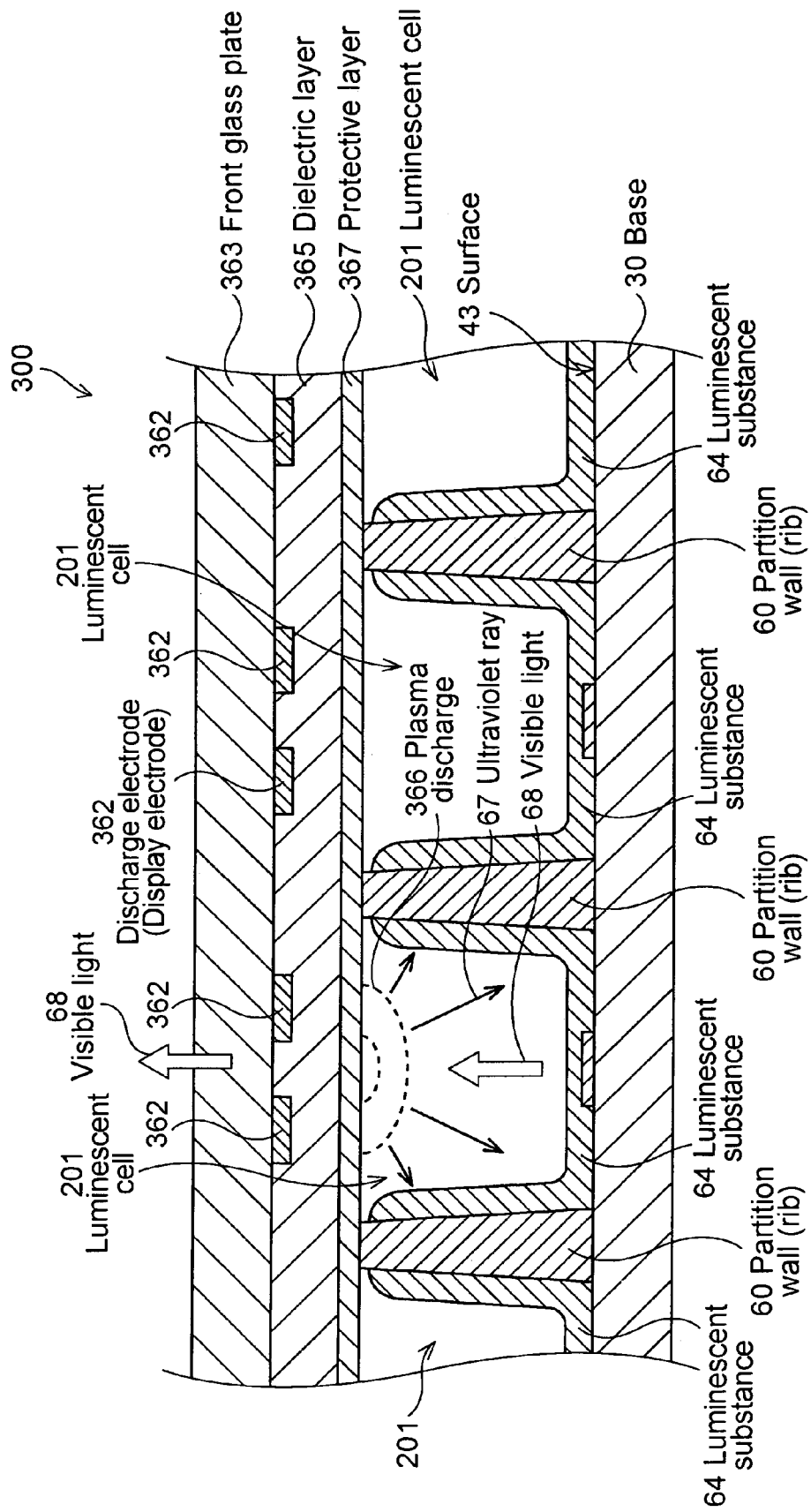
FIG. 9 is a sectional view showing part of a display according to another embodiment of the present invention.
Figure 10:
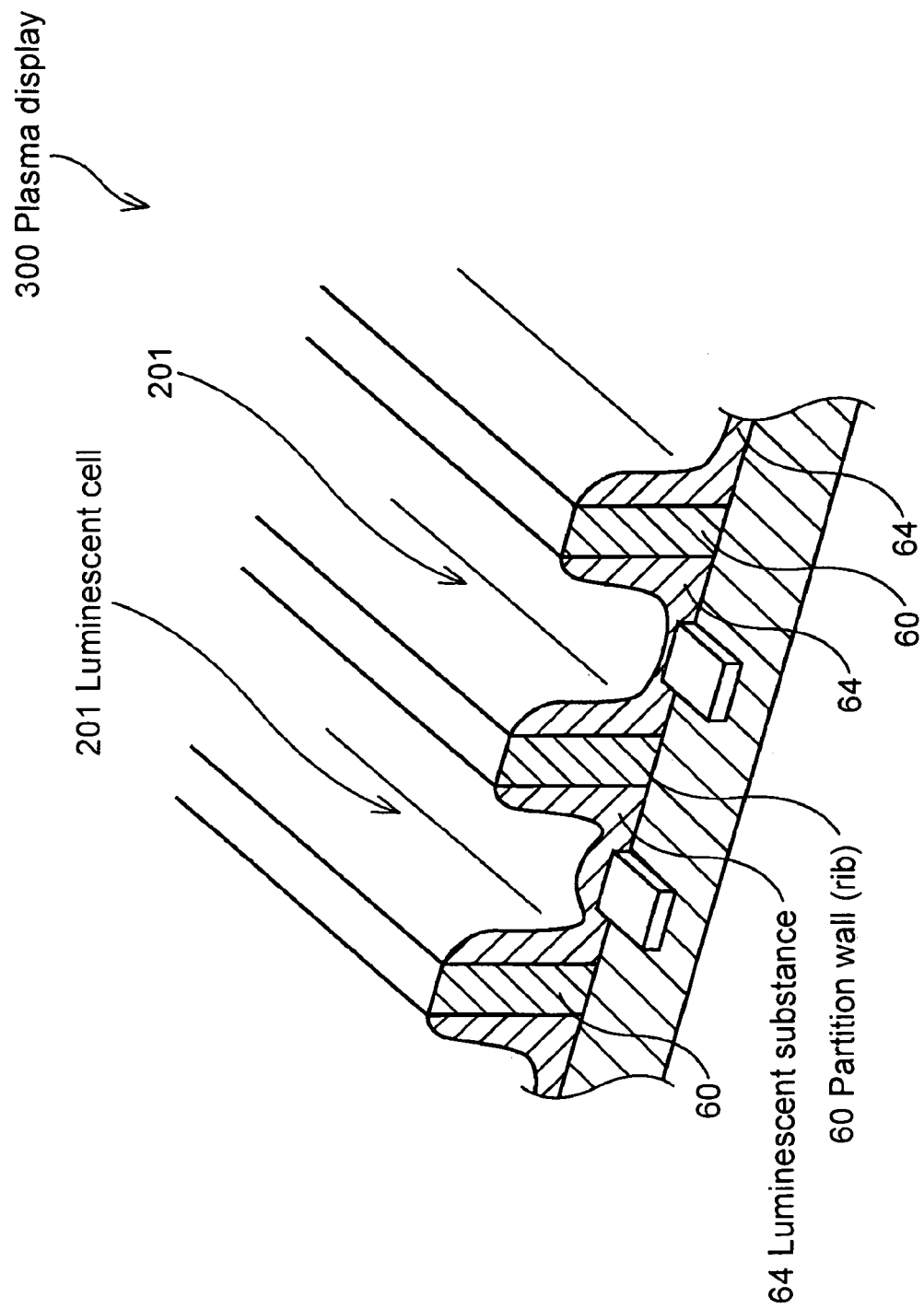
FIG. 10 is a perspective view showing an example of the configuration of the partition wall included in the display shown in FIG. 9.

FIGS. 9 and 10 show a display according to another embodiment of the present invention.

A plasma display 300 shown in FIG. 9 is a so-called alternating-current (AC) type. The base 30 is a back glass plate, for example. The partition wall 60 is formed on the surface 43 of the base 30, projecting from the surface. The luminescent substance 64 is formed between each partition wall 60.

On the inside of a front glass plate 363, a dielectric layer 365 and a protective layer 367 are stacked. The dielectric layer 365 and the protective layer 367 are transparent. In the dielectric layer 365, a discharge electrode (or a display electrode) 362 is provided.

The discharge electrode 362 corresponds to the luminescent cell 201 defined by the partition wall 60. When electrifying the discharge electrode 362, this discharge electrode 362 produces a plasma discharge 366. The ultraviolet ray 67 out of the plasma discharge 366 is supplied to the luminescent substance 64. Then the luminescent substance 64 emits visible light 68, which displays color images outside through the protective layer 367, the dielectric layer 365, and the front glass plate 363.

Here, the partition wall 60 is aligned parallel to one another as shown in FIG. 10, and the adjacent partition wall forms the luminescent cell 201.

By using the method and the device for manufacturing a display of the present invention, it is possible to economically and accurately form a partition wall on a base of a plasma display. By evenly applying the inorganic micro-powder 33 such as a glass micro-powder on the surface of the base and melting the inorganic micro-powder by irradiating the inorganic micro-powder layer with laser light, it is possible to form the base having the partition wall with high accuracy and production efficiency.

Unlike the conventional screen printing method, the method and the device for manufacturing a display of the present invention require no sintering of the base in a furnace, and thus there will be no deviation in positions of the partition wall while forming the partition wall with the alignment of the base. Also unlike the conventional screen printing method, the method and the device for manufacturing a display of the present invention are capable of patterning the partition wall using laser light without contacting, and thereby not damaging the pattern of the partition wall.

Also in the method and the device for manufacturing a display of the present invention, it is possible to reduce or eliminate air holes trapped in the formed partition wall by using a decompressed inert gas preferably having the same composition as a luminescent gas used in a luminescent cell when melting the inorganic micro-powder layer of a glass micro-powder or the like with a predetermined pattern.

The present invention employs so-called dry processing, which requires no waste liquid treatment. The unused inorganic micro-powder remaining unmelted out of the formed inorganic micro-powder layer is collected. Thus the inorganic micro-powder is used highly efficiently.

Furthermore, since the present invention requires no mask unlike the screen printing method, it is possible to form a large partition-wall structure on the surface of a large base without restriction caused by the size of such a mask.

Also unlike the conventional screen printing method, the present invention makes it possible to include a sintering process using laser light, which makes it easy to provide the partition wall to a predetermined height.

Compared to conventional sandblasting, the present invention makes it possible to shorten the time for processing the partition wall, and to use materials including a pigment and luminescence materials in the inorganic micro-powder for forming the partition wall.

Applications of the method and the device for manufacturing a display of the present invention are not limited to the formation of a partition wall included in a luminescent cell of a display, but include various products of other fields. Examples of them may include the formation of a projecting partition wall in a glass craft.

In this case the device for manufacturing a display shown in FIG. 1 and the method for manufacturing a display will be a device for manufacturing a product and a method for manufacturing a product.

Examples of the laser light source 15 may include a femtosecond laser. The femtosecond laser is a laser light source that has received increasing attention in recent years.

Unlike the above-mentioned carbon dioxide laser, using the femtosecond laser makes energy concentrated on the inorganic micro-powder 33, which is a non-processed material, in an extremely short period of time. Therefore, meltdown of the inorganic micro-powder 33 advances before heat is generated. Since processing only in irradiated parts of the inorganic micro-powder 33 with laser light is induced, there would be no damage in non-irradiated parts of the inorganic micro-powder 33.

The wavelength of the femtosecond laser light is 800 nm, for example, which is not absorbed by glass in nature. By giving energy in an extremely short period of time, however, a phenomenon called multigrid absorption occurs. Thus, the above-mentioned irradiated parts of the inorganic micro-powder 33 with the laser light are hardened by causing glass molecules to evaporate without meltdown. Since the heat of the laser light is hard to transmit to areas surrounding the irradiated parts, it is possible to process the irradiated parts with resolution of several micrometers, for example.

While the partition wall forming the luminescent cell is illustrated and shown in the above-mentioned embodiments and the accompanying drawings, the configuration of the partition wall is not limited to this. It is also possible to use a partition wall including different configurations.

While a plasma display is used as the display in the embodiments, it is also possible to apply the method and the device for manufacturing a display according to the present invention to other types of displays, such as an electroluminescent (EL) display, a liquid crystal display or a field emission display (FED) enabling gap control.

It should be also understood that the present invention is not limited to the above-mentioned embodiments, and various changes can be made without departing from the spirit and scope of the invention as set forth in the claims.

Some elements of the above-mentioned embodiments may be omitted and combined differently from the above description.

What is claimed is:

1. A method for manufacturing a display having a partition wall on a base, comprising:
   disposing the base in a chamber;
   after disposing the base in the chamber, forming an inert gas atmosphere at a pressure less than atmospheric pressure inside the chamber;
   after forming an inert gas atmosphere, forming an inorganic micro-powder layer on the base, the inorganic micro-powder layer including a pigment formed of $Fe_3O_4$;
   planarizing the inorganic micro-powder layer with a blade such that the inorganic micro-powder layer has a uniform thickness;
   after the step of planarizing the inorganic micro-powder layer, forming the partition wall by irradiating the inorganic micro-powder layer on the base with laser light to melt the inorganic micro-powder layer;
   after the step of forming the partition wall, absorbing any un-melted inorganic micro-powder with an absorber device; and
   after absorbing the un-melted micropowder, removing any remaining un-melted inorganic micro-powder by cleaning the base with a surface active agent: and
   after removing any remaining un-melted inorganic micro-powder, drying the base with hot air.

2. The method for manufacturing a display according to claim 1, wherein the pigment is added so as to prevent visible light from leaking from the partition wall.

3. The method for manufacturing a display according to claim 2, wherein the pigment includes a component for absorbing the laser light.

4. The method for manufacturing a display according to claim 1, wherein a scanning operation of the laser light is carried out along the inorganic micro-powder layer.

5. The method for manufacturing a display according to claim 1, wherein a height of the partition wall on the base is set by repeating the step of forming the inorganic micro-powder layer, the step of planarizing the inorganic micro-powder layer, and the step of forming the partition wall.

* * * * *